US010069804B2

United States Patent
Rozenberg et al.

(10) Patent No.: US 10,069,804 B2
(45) Date of Patent: Sep. 4, 2018

(54) TOKENIZATION OF STRUCTURED DATA

(71) Applicant: Protegrity Corporation, Grand Cayman (KY)

(72) Inventors: Yigal Rozenberg, Wilton, CT (US); Ulf Mattsson, Cos Cob, CT (US); Raul Ortega, Westport, CT (US)

(73) Assignee: Protegrity Corporation, Grand Cayman (KY)

( * ) Notice: Subject to any disclaimer, the term of this patent is extended or adjusted under 35 U.S.C. 154(b) by 266 days.

(21) Appl. No.: 15/236,489

(22) Filed: Aug. 15, 2016

(65) Prior Publication Data
US 2016/0380982 A1 Dec. 29, 2016

Related U.S. Application Data

(63) Continuation of application No. 14/480,465, filed on Sep. 8, 2014, now Pat. No. 9,443,104.

(51) Int. Cl.
*G06F 21/00* (2013.01)
*H04L 29/06* (2006.01)
(Continued)

(52) U.S. Cl.
CPC .... *H04L 63/0428* (2013.01); *G06F 17/30867* (2013.01); *G06F 21/6254* (2013.01);
(Continued)

(58) Field of Classification Search
CPC . H04L 63/06; H04L 63/0428; H04L 63/0414; H04L 2209/043; G06F 17/30867; G06F 21/6254

See application file for complete search history.

(56) References Cited

U.S. PATENT DOCUMENTS 6,360,254 B1 * 3/2002 Linden .............. G06F 17/30876
707/E17.112
7,739,338 B2 * 6/2010 Taylor .................... H04L 51/12
380/44
(Continued)

OTHER PUBLICATIONS

"Email Address Encoder: reCAPTCHA Mail Hide—Stop Spam Bots Harvesting Your Email Address from Webpages," Megaleecher.Net, 2006-2013, 2 pages, [Online] [Retrieved on Sep. 3, 2014] Retrieved from the Internet<URL: http://www.megaleecher.net/taxonomy/term/3129#axzz3CHCUCTHJ>.
(Continued)

*Primary Examiner* — Beemnet W Dada
(74) *Attorney, Agent, or Firm* — Fenwick & West LLP

(57) ABSTRACT

Structured data, such as email addresses, social security numbers, and the like is accessed for encoding. A set of encoding rules including one or more encoding actions and/or encoding components corresponding to each of one or more structured data components is accessed. The set of encoding rules can include one or more encoding actions and/or one or more encoding components corresponding to each of one or more structured data components. Encoding actions can include tokenization, encryption, data masking, data modification, and the like. The one or more components of the structured data are encoded based on the accessed set of encoding rules. The encoded structured data is stored, processed, or outputted to an external entity.

20 Claims, 3 Drawing Sheets

(51) Int. Cl.
*G06F 21/62* (2013.01)
*G06F 17/30* (2006.01)

(52) U.S. Cl.
CPC .......... *H04L 63/0414* (2013.01); *H04L 63/06* (2013.01); *H04L 2209/043* (2013.01)

(56) References Cited

U.S. PATENT DOCUMENTS

| | | | |
|---|---|---|---|
| 9,397,991 B2* | 7/2016 | Bi | G06F 21/10 |
| 9,443,104 B2* | 9/2016 | Rozenberg | H04L 63/0414 |
| 9,712,469 B2* | 7/2017 | Hamburg | H04L 51/14 |
| 2004/0054887 A1* | 3/2004 | Paulsen, Jr. | G06Q 10/107 |
| | | | 713/154 |
| 2011/0299675 A1* | 12/2011 | Stucker | H04M 3/428 |
| | | | 379/207.02 |
| 2013/0080775 A1* | 3/2013 | Liebmann | H04L 63/0471 |
| | | | 713/168 |
| 2017/0372406 A1* | 12/2017 | Custer | G06Q 30/0637 |

OTHER PUBLICATIONS

Encoding Email to Help Prevent Spam—Web Center, Ohlone College, Last Modified Feb. 20, 2014, 2 pages, [Online] [Retrieved on Sep. 3, 2014] Retrieved from the Internet<URL: http://www.ohlone.edu/org/webcenter/emailencoding.html>.

U.S. Appl. No. 13/595,439, filed Aug. 27, 2012, Inventors Chia-Ming Kuo et al.

U.S. Office Action, U.S. Appl. No. 14/480,465, dated Jan. 20, 2016, 10 pages.

* cited by examiner

TOKENIZATION OF STRUCTURED DATA

CROSS REFERENCE TO RELATED APPLICATIONS

This application is a continuation of U.S. application Ser. No. 14/480,465, filed Sep. 8, 2014, now U.S. Pat. No. 9,443,104, which is incorporated by reference in its entirety.

FIELD OF ART

This application relates to the field of data protection, and more specifically to the protection of structured data using tokenization.

BACKGROUND

Many websites, services, and applications implement various data protection techniques. Certain techniques involve the use of an encryption key or password that can be subject to interception or brute force guessing. Other methods may protect data but require extensive computing resources to encode and decode data. Such methods often fail to utilize various data format advantages of structured data when protecting the data. Often, distinct systems implementing data protection techniques are required to store information associated with the protected data within distinct repositories or databases. Thus, it may be advantageous to implement data protection techniques for structured data that utilize properties or characteristics associated with the structured data.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

Figure 1:
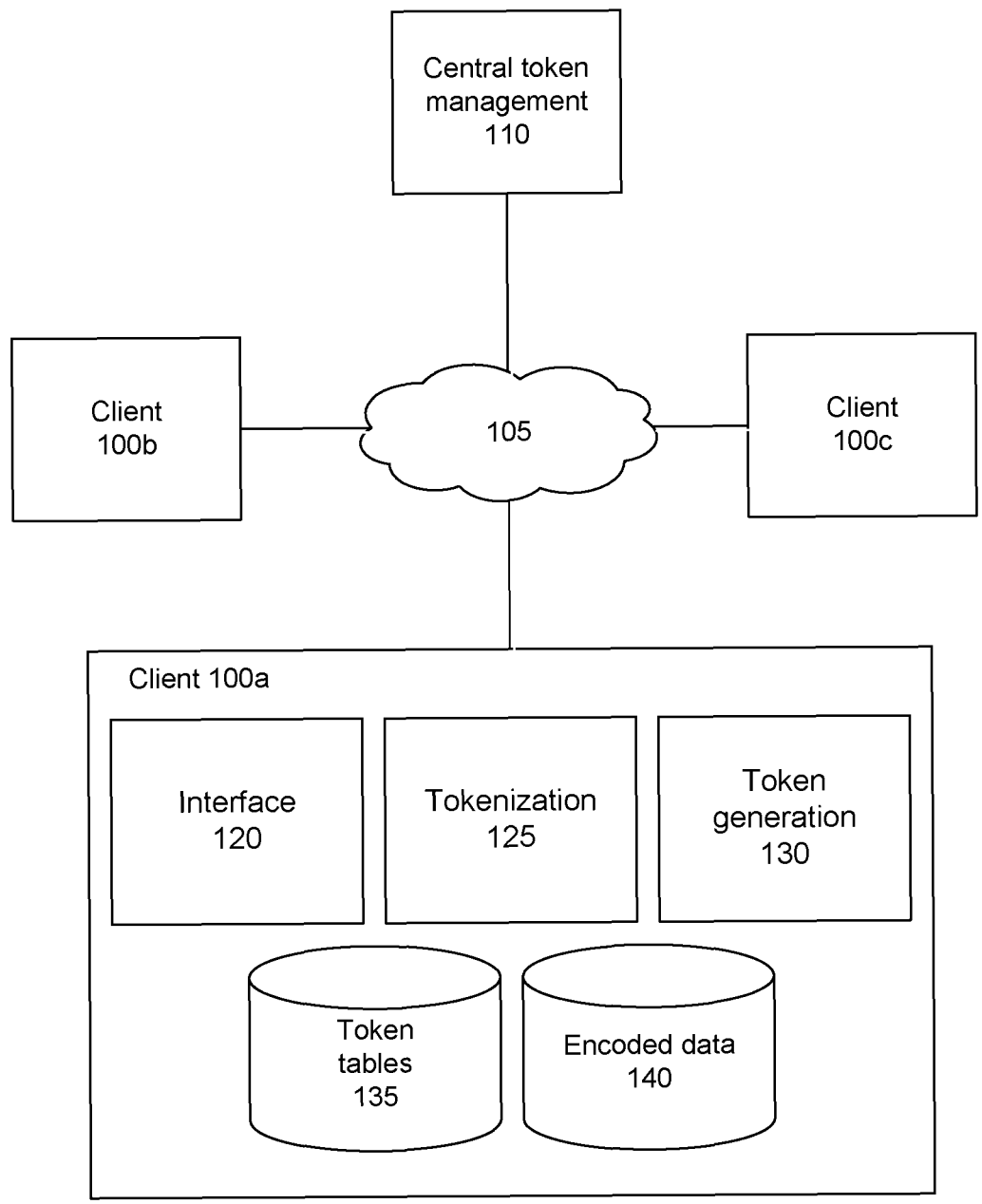
FIG. 1 is a system diagram of a tokenization environment, according to one embodiment.

The figures (Figs.) depict embodiments for purposes of illustration only. One skilled in the art will readily recognize from the following description that alternative embodiments of the structures and methods illustrated herein can be employed without departing from the principles of the invention described herein.

DETAILED DESCRIPTION

Reference will now be made in detail to several embodiments, examples of which are illustrated in the accompanying figures. It is noted that wherever practicable, similar or like reference numbers can be used in the figures and can indicate similar or like functionality. The figures depict embodiments of the disclosed system (or method) for purposes of illustration only. One skilled in the art will readily recognize from the following description that alternative embodiments of the structures and methods illustrated herein can be employed without departing from the principles described herein.

Tokenization Overview

The transmission and storage of sensitive data, such as passwords, credit card numbers, social security numbers, bank account numbers, driving license numbers, transaction information, date information, etc, can be challenging. Before sensitive data can be transmitted or stored, the sensitive data can be tokenized into tokenized data to prevent an unauthorized entity from accessing the data.

As used herein, the tokenization of data refers to the generation of tokenized data by querying one or more token tables mapping input values to tokens with the one or more portions of the data, and replacing the queried portions of the data with the resulting tokens from the token tables. Tokenization can be combined with encryption for increased security, for example by encrypting sensitive data using a mathematically reversible cryptographic function (e.g., datatype-preserving encryption or DTP), a one-way non-reversible cryptographic function (e.g., a hash function with strong, secret salt), or a similar encryption before or after the tokenization of the sensitive data. Any suitable type of encryption can be used in the tokenization of data. A detailed explanation of the tokenization process can be found in U.S. patent application Ser. No. 13/595,439, filed Aug. 27, 2012, which is hereby incorporated by reference.

As used herein, the term token refers to a string of characters mapped to an input string of characters in a token table, used as a substitute for the string of characters in the creation of tokenized data. A token can have the same number of characters as the string being replaced, or can have a different number of characters. Further, the token can have characters of the same type (such as numeric, symbolic, or alphanumeric characters) as the string of characters being replaced or characters of a different type.

Any type of tokenization can be used to perform the functionalities described herein. One such type of tokenization is static lookup table ("SLT") tokenization. SLT tokenization maps each possible input values (e.g., possible character combinations of a string of characters) to a particular token. An SLT includes a first column comprising permutations of input string values, and can include every possible input string value. The second column of an SLT includes tokens, with each associated with an input string value of the first column. Each token in the second column can be unique among the tokens in the second column. Optionally, the SLT can also include one or several additional columns with additional tokens mapped to the input string values of the first column.

In some embodiments, to increase the security of tokenization, sensitive data can be tokenized two or more times using the same or additional token tables. For example, the first 8 digits of a 16 digit credit card number can be tokenized with an 8 digit token table to form first tokenized data, and the last 12 digits of the first tokenized data can be tokenized using a 12 digit token table to form second tokenized data. In another example, the first 4 digits of a credit card number are tokenized using a first token table, the second 4 digits are tokenized with a second token table, the third 4 digits are tokenized with a third token table, and the last 4 digits are tokenized with a fourth token table. Certain sections of the sensitive data can also be left un-tokenized; thus a first subset of the resulting tokenized data can contain portions of the sensitive data and a second subset of the tokenized data can contain a tokenized version of the sensitive data.

Dynamic token lookup table ("DLT") tokenization operates similarly to SLT tokenization, but instead of using static tables for multiple tokenizations, a new token value is generated and included in a token table entry each time sensitive data is tokenized. The new token value can be generated randomly, can be randomly selected from among a set of values, or can be generated via any other suitable means. A seed value can be used to generate token values, to select a set of values from which to select a token value from among multiple sets of values, or to randomly select a value from among a set of values for use as the token value. It should be noted that as used herein, "randomly" can refer to pseudo-randomly or substantially randomly. The seed value can include a portion of data being tokenized.

In some embodiments, a DLT can map portions of sensitive data being replaced by a token to a token. The DLT can include the entire sensitive data (including portions of the sensitive data that are not replaced by a token), and the DLT can indicate the portion of the sensitive data being replaced by the token and can map the portion to the token. DLTs can in some configurations provide a higher level of security compared to SLT but require the storage and/or transmission of a large amount of data associated with each of the generated token tables. It should be noted that DLT tokenization can be used to tokenize data according to the principles described above with regards to SLT tokenization.

The security of tokenization can be further increased through the use of initialization vectors ("IVs"). An initialization vector is a string of data used to modify sensitive data prior to tokenizing the sensitive data. Example sensitive data modification operations include performing linear or modulus addition on the IV and the sensitive data, performing logical operations on the sensitive data with the IV, encrypting the sensitive data using the IV as an encryption key, and the like. The IV can be a portion of the sensitive data. For example, for a 12-digit number, the last 4 digits can be used as an IV to modify the first 8 digits before tokenization. IVs can also be retrieved from an IV table, received from an external entity configured to provide IVs for use in tokenization, or can be generated based on, for instance, the identity of a user, the date/time of a requested tokenization operation, based on various tokenization parameters, and the like. Data modified by one or more IVs that is subsequently tokenized includes an extra layer of security—an unauthorized party that gains access to the token tables used to tokenized the modified data will be able to detokenize the tokenized data, but will be unable to de-modify the modified data without access to the IVs used to modify the data.

Structured Data Overview

As used herein, "structured data" refers to data with one or more format restrictions or definitions. Example categories of structured data include email addresses, physical addresses, names, social security numbers, dates, credit card numbers, bank account numbers, phone numbers, computer files, data tables, and the like. In some embodiments, the format restrictions associated with structured data specify one or more structured data components. For example, email addresses include three components: a local name, a domain name, and an extension. Similarly, a physical address can include five components: a street name/number, a city, a state, a zip code, and a country. In some embodiments, the format restrictions include component length restrictions. For instance, a social security number can include one 9-number field, or can include three components: a 3-number field, a 2-number field, and a 4-number field.

In some embodiments, the format restrictions associated with structured data include character restrictions. For instance, social security numbers can only include numerical characters, while computer files can include any character (alphanumeric or symbolic). In some embodiments, the character restrictions associated with structure data can vary component-by-component. For example, the "state" component of a physical address can only include letter characters, and the domain component of an email address can only include alphanumerical characters.

In some embodiments, the format restrictions associated with structured data can include data content restrictions. For example, the "street name" component of a physical address can require both a building number and a street name. Likewise, certain formats of computer files can require a file header, a file extension, and the like. In some embodiments, structured data can include multiple acceptable component formats. For example, a date can be associated with the format "MMDDYYYY" (e.g., 12281981), or can be associated with the format "Month Day, Year" (e.g., December 28, 1982). In some embodiments, the format restrictions associated with structured data can specify that one or more components are mandatory and that one or more components are optional. For example, for a physical address, the street number and zip code can be mandatory, while the city, state, and country components are optional. In such embodiments, when structured data is accessed that does not include one or more mandatory components, the data can be rejected, and when structured data is access that includes all mandatory components but not all optional components, the data can be accepted.

Structured data can include sensitive information. Social security numbers and credit card numbers are obvious examples of sensitive information, but email addresses can also include sensitive information (such as a user's full legal name, place of employment, etc.). Further, certain structured data (such as email addresses, social security numbers, and the like) can be used by a user to access one or more online services or accounts associated with the user. Finally, certain structured data, when available to unauthorized entities, can expose a user to spam (email or physical mail), to unwanted solicitations (for instance, by phone), to identity theft or financial theft, and the like. Protecting one or more structured data components can prevent such malicious activity if the structured data is accessed by an unauthorized entity.

Tokenization System Overview

FIG. 1 is a system diagram of a tokenization environment, according to one embodiment. The environment of FIG. 1 includes a plurality of clients 100A, 100B, and 100C ("clients 100" hereinafter), and a central token management system 110, communicatively coupled via a network 105. Each client 100 can be a retailer, business, or other organization, though it should be noted that clients can also be individual users or any other suitable entity. A first client can receive structured data, for instance a credit card number or email address during the course of an interaction with a second client, can protect one or more components of the structured data, and can process, store, or output the protected structured data. It should be noted that while three clients 100 are illustrated in the embodiment of FIG. 1, other embodiments of the system environment can contain any number of clients and/or other entities.

A client 100 is a computing device capable of communicating with other entities within the embodiment of FIG. 1 via the network 105. For example, the client can include a desktop computer, laptop computer, smart phone, tablet computing device, server, cloud server, payment terminal, or any other device having computing and data communication capabilities. Each computing device includes one or more processors, memory, storage, and networking components. Each client is coupled to the network and can interact with other entities coupled to the network using software such as a web browser or other application with communication functionality. Such software can include an interface for communicating with the other modules via the network.

The network 105 connecting the various modules is typically the Internet, but can be any network, including but not limited to a local area network (LAN), metropolitan area network (MAN), wide area network (WAN), cellular network, wired network, wireless network, private network, virtual private network (VPN), direct communication line, and the like. The network can also be a combination of multiple different networks.

In the embodiment of FIG. 1, the client 100a includes an interface module 120, a tokenization module 125, a token generation module 130, a token tables storage module 135, and an encoded data module 140. The interface module is configured to provide an interface between entities external to the client and modules within the client. For instance, the interface module can provide an interface prompting a customer to swipe a credit card, and can transfer the credit card number received in response to the tokenization module 125 for tokenization. Likewise, the interface module can receive an email address entered by a user, and can provide the email address to the tokenization module 125 for tokenization. The interface module can provide a graphic user interface (GUI) to entities external the client (for instance, via a display or a web page), and/or can provide a communicative interface configured to automatically route received structured data. The interface module can also provide an interface for communications between modules of the client, for instance routing tokens generated by the token generation module to the token tables storage module and tokenized data to the tokenized data storage module. The interface module can also request and receive token tables and other encoding information (such as IVs and encryption keys) from the central token management system 110.

The tokenization module 125 is configured to receive structured data, for instance structured data received from an entity external to the client 100a, to encode one or more components of the structured data, and to store or transmit the encoded data. In the embodiments described herein, the tokenization module performs tokenization operations to encoded components of structured data, though it should be noted that in other embodiments, the tokenization module performs other types of encoding operations (such as encryption, data randomization, data modification, and the like), and/or performs combinations of encoding operations (such as tokenization and encryption).

The tokenization module 125 accesses a set of encoding rules associated with a category of the received structured data. In some embodiments, the set of encoding rules is specific to the category of the received structured data. The set of encoding rules can be selected based on the identity of the entity from which the structured data is received, based on the date or time at which the structured data is received, based on the identity of the entity to which the protected structured data will be provided, or based on any other suitable factor. The accessed set of encoding rules can be received from the entity from which the structured data was received (for instance, in conjunction with receiving the structured data), can be accessed from local storage (for instance, from a storage module within the client 100a), can be accessed from an external entity configured to store and provide sets of encoding rules, or can be generated, for instance by the tokenization module or any other suitable module or entity.

The set of encoding rules specifies one or more encoding actions for each of one or more components of the category of structured data associated with the set of encoding rules. Encoding actions include: tokenization, partial tokenization (the tokenization of a part of a structured data component), encryption, data modification, data masking, data hiding, and the like. Each set of encoding rules may also specify one or more encoding components for use in encoding the structured data, such as the identity of one or more token tables for use in tokenizing one or more components of the structured data, one or more IVs for use in data modification of one or more structured data components, one or more encryption keys or encryption algorithms for use in encrypting one or more components of the structured data, and the like. Finally, one or more encoding actions included within the set of encoding rules can specify one or more components of the structured data to remain unencoded (or, in other words, to remain as "clear text") while encoded the remainder of the structured data components. It should be noted that in some embodiments, the encoding actions and encoding components specified in a set of encoding rules for a first component of structured data are independent of the encoding actions and encoding components specified in the set of encoding rules for a second component of the structured data. It should also be noted that in some embodiments, encoding actions can apply to more than one component. For instance, the set of encoding rules can include an encryption operation corresponding to the local name component of an email address and the domain name component of the email address. In such an embodiment, encoding the email address includes encrypting the local name component and the domain name component of the email address using the encryption operation included within the set of encoding rules.

In some embodiments, the set of encoding rules specify encoding actions or encoding components based on a security or sensitivity level associated with the structured data or with the structured data component being encoded. For instance, structured data, and components within the structured data, can be assigned a security level. For example, social security numbers can be categorized as "high security", and names can be categorized as "low security". Likewise, the local name component of an email address can be categorized as "high security", the domain name component of an email address can be categorized as "medium security", and the extension component of an email address can be categorized as "low security". In some embodiments, the number and/or types of encoding actions within a set of encoding rules can be selected based on a security level of the structured data or a structured data component. In some embodiments, the encoding actions within the set of encoding rules can be selected based on a level of desired data generalization. For instance, in order to generalize and/or ambiguate data, encoding actions can be selected to hide one or more data components. For example, in order to generalize a physical address, the street name/number can be hidden at a low level of generalization, and the street name/number, city, and zip code can be hidden at a high level of generalization. In some embodiments, the encoding actions (such as data hiding or masking) can be permanent/non-reversible, allowing such encoded data to be permanently generalized, increasing the security/privacy of the data. For example, the local name component of an email address can be permanently hidden or masked by replacing the local name component with the character string "xxxxxx". A user or entity that subsequently accesses the encoded email address will name be able to decode the local name component of the encoded email address, but can still obtain some benefit from the encoded email address (for instance, by determining a number of encoded email addresses associated with each of a plurality of domain components).

The tokenization module 125 encodes the received structured data based on the accessed set of encoding rules associated with the category of the received structured data. For each component of the structured data, the tokenization module performs any encoding actions specified by the set of encoding rules associated with the component, using any token tables, IVs, encryption keys, encryption algorithms, and the like identified by the set of encoding rules. For instance, if a set of encoding rules identifies a tokenization operation and a token table for a first structured data component, and identifies an encryption algorithm for a second structured data component, the tokenization module can encode the structured data by tokenizing the first component using the identified token table and encrypting the second component using the identified encryption algorithm. Examples of encoding structured data are described in greater detail below with regards to FIGS. 2 and 3.

The tokenization module 125 can request one or more token tables from the token generation module 130 for use in encoding structured data. In some embodiments, the tokenization module requests one or more token tables from the token generation module that are identified by the accessed set of encoding rules. In other embodiments, the tokenization module requests one or more token tables based on the identity of the entity from which the structured data is received, based on the identity of a user requesting encoding of the structured data or associated with the interaction with the client device 100a, based on a time or date of the encoding, based on a type of interaction with the client device (such as a financial transaction, the sending of an email, an identity request, etc.), based on the category of structured data, or based on any other suitable factor. The token generation module can generate a token table randomly, based on the identity of the entity from which the structured data is received, based on the identity of a user requesting encoding of the structured data or associated with the interaction with the client device, based on a time or date of the encoding, based on a type of interaction with the client device, based on the category of structured data, or based on any other suitable factor. Generated token tables can be stored in the token tables storage module 135. In some embodiments, the token generation module selects one or more pre-generated token tables stored in the token tables storage module for use in encoding structured data, for instance randomly, based on the based on the identity of the entity from which the structured data is received, based on the identity of a user requesting encoding of the structured data or associated with the interaction with the client device, based on a time or date of the encoding, based on a type of interaction with the client device, based on the category of structured data, or based on any other suitable factor.

The token generation module 130 can receive a seed value (for instance, in conjunction with receiving structured data or from a set of encoding rules), such as an initialization vector, for use in generating or selecting a token table. The seed value can include a portion of the structured data itself (such as all or part of one or more components of the structured data), can be associated with the context of the encoding operation (for instance, the identity of an entity associated with the encoding operation, the time/date of the encoding operation, the category of structured data, and the like). It should be noted that in some embodiments, the token generation module generates or selects a token from among a set of potential token tables unique to the client 100a. The token generation module can request one or more token tables from the central token management system 110, can provide corresponding received token tables to the tokenization module 125, and can store received token tables in the token tables storage module 135 for subsequent access.

The tokenization module 125 can access, request, or select token tables based on one or more character restrictions associated with a structured data component being tokenized. For instance, if a structured data component includes a character restriction (such as including only numerical characters, only alphanumeric characters, etc.), a token table can be selected that maps input values to tokens subject to the same character restrictions. For example, for a zip code component (which can include only numerical characters), a token table can be selected that includes only numerical character tokens. In some embodiments, a token table can be selected that maps input values to tokens that are not subject to the same character restrictions as a structured data component being tokenized, enabling a user or entity to identify the tokenized component as being tokenized. For example, if the zip code component "94002" is tokenized to the value "4M8E1", a user can identify that the zip code component is tokenized, as the tokenized zip code component includes characters not permissible in zip codes (in this example, alphabetical characters).

After encoding structured data, the tokenization module 125 can transmit the encoded data to an external entity (such as a bank, payment processor, retailer, financial institution, email server, cloud server, and the like), or can store the encoded data in the encoded data storage module 140. The tokenization module can also store an association between the set of encoding rules used to encode the structured data in conjunction with the encoded structured data.

Although not described further herein, encoded data can be subsequently accessed, for instance from the encoded data storage module 140. The accessed encoded data can be decoded by accessing the decoded data and the set of encoding rules used to encode the structured data, and decoding each component of the encoded structured data based on the encoding actions associated with the component specified in the set of encoding rules. For instance, if a component of structured data is tokenized using an identified token table, the component can be detokenized by accessing the identified token table, querying the token table with the tokenized component to identify the value mapped to the tokenized component, and replacing the tokenized component with the identified value.

The central token management system 110 can interface with the clients 100 to perform a variety of pre- and post-encoding operations. For instance, the central token management system can generate and provide SLT token tables to clients. Similarly, the central token management system can track tokens stored within DLTs at each client, and can be queried by a client to determine if a token associated with a portion of sensitive data already exists within a DLT at another client. The central token management system can also track duplicate tokens (different tokens at different DLTs mapped to the same sensitive data portion) between the clients, and can store the duplicate tokens for subsequent auditing/analysis. In some embodiments, instead of storing duplicate tokens, a hash representative of each token or a reference to a DLT is stored at the central token management system. The central token management system can also synchronize tokens stored within DLTs at different clients, and can track where each token is created, the circumstances of the creation of the token, the use of each token, and any other information associated with the tokens, the clients, or tokenization operations.

Structured Data Encoding Operation

Figure 2:
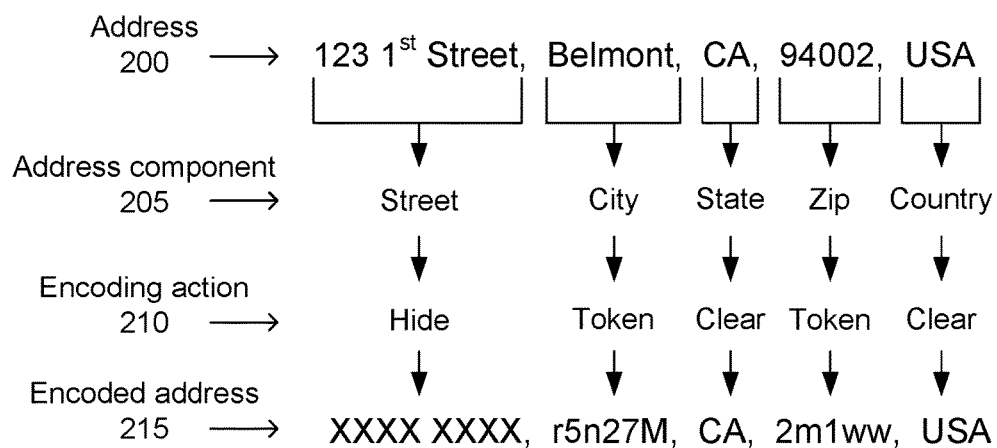
FIG. 2 illustrates the encoding of a structured physical address, according to one embodiment.

FIG. 2 illustrates the encoding of a structured physical address, according to one embodiment. The physical address 200 of FIG. 2 includes five components 205: a street ("123 1$^{st}$ Street"), a city ("Belmont"), a state ("CA"), a zip code ("94002"), and a country ("USA"). A set of encoding rules associated with the structured physical address is accessed, specifying an encoding action 210 associated with each component.

In the embodiment of FIG. 2, the encoding action 210 for the street component specifies that the street component is hidden (and thus is stored/displayed as "XXXX XXXX" in the embodiment of FIG. 2, though it should be noted that other methods of hiding can be implemented in other embodiments). The encoding action for the city component specifies a tokenization operation, resulting in the tokenization of the city component (e.g., the querying of a token table with "Belmont", and the replacement of "Belmont" with the corresponding token "r5n27M"). The encoding action for the state component specifies that the state component is maintained as clear text. The encoding action for the zip code component specifies a tokenization operation, and the encoding action for the country component specifies that the country component is maintained as clear text. The resulting encoded physical address 215 is "XXXX XXXX, r5n27M, CA, 2m1ww, USA".

Figure 3:
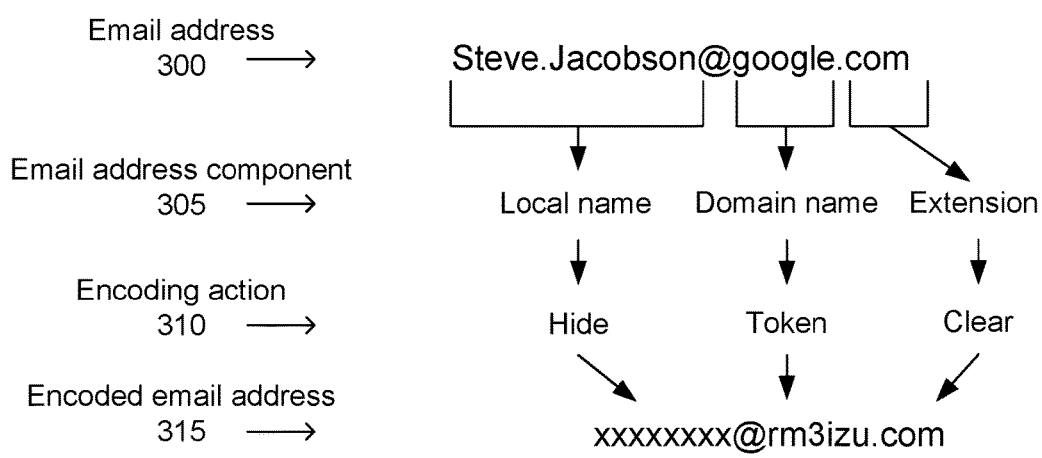
FIG. 3 illustrates the encoding of an email address, according to one embodiment.

FIG. 3 illustrates the encoding of an email address, according to one embodiment. The email address 300 includes three components 305: a local name ("Steve.Jacobson"), a domain name ("google"), and an extension (".com"). A set of encoding rules associated with the email address is accessed, specifying an encoding action 310 associated with each component. In the embodiment of FIG. 3, the encoding action for the local name component specifies that the local name component is hidden. The encoding action for the domain name component specifies a tokenization operation, resulting in the tokenization of the domain name component. Finally, the encoding action associated with the extension component specifies that the extension component is maintained as clear text. The resulting encoded email address 315 is "xxxxxxxx@rm3izu.com".

In the embodiment of FIG. 3, it should be noted that the set of encoding rules can specify tokenization operations for each email address component using one or more token tables corresponding to the email address component type. For example, in tokenizing the local name component, one or more token tables can be selected from a set of token tables corresponding to local name components. Likewise, in tokenizing the domain name component and the extension component, one or more token tables can be selected a set of token tables corresponding to domain name components and one or more token tables can be selected from a set of token tables corresponding to extension components, respectively. Similarly, the set of encoding rules can include encoding actions for each email address component type. For instance, the set of encoding rules can specify, for each email address component, encryption algorithms, tokenization operations, data masking operations, and the like corresponding to the email address component type. Finally, the set of encoding rules can specify encoding components other than token tables for each email address component based on the component type. For example, the set of encoding rules can specify an encryption key for use in encrypting the local name component from a set of encryption keys corresponding to local name components, can specify an encryption key for use in encrypting the domain name component from a set of encryption keys corresponding to domain name components, and can select an encryption key for use in encrypting the extension component from a set of encryption keys corresponding to extension components.

Figure 4:
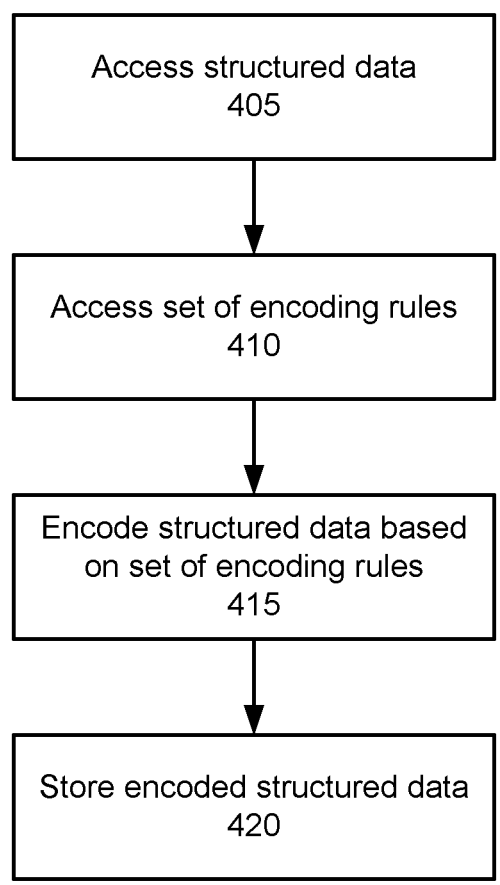
FIG. 4 is a flow chart illustrating a process for encoding structured data, according to one embodiment.

FIG. 4 is a flow chart illustrating a process for encoding structured data, according to one embodiment. Structured data is accessed 405, the structured data including one or more components. As noted above, structured data can include email addresses, physical addresses, phone numbers, social security numbers, credit card numbers, and the like. A set of encoding rules is accessed 410. The set of encoding rules specifies one or more encoding actions and/or one or more encoding components for use in encoding the accessed structured data.

The structured data is encoded 415 based on the accessed set of encoding rules. Each component of the structured data is encoded based on the encoding actions and encoding components within the accessed set of encoding rules that correspond to the component. For instance, if the set of encoding rules specifies an encryption key and encryption algorithm for a first component, an IV and a data modification for a second component, and a tokenization operation and token table for a third component, encoding the structured data includes encrypting the first component with the encryption key, modifying the second component with the IV, and tokenizing the third component with the token table. The encoded structured data is stored 420 for subsequent use, access, and/or processing.

Additional Configuration Considerations

The present invention has been described in particular detail with respect to one possible embodiment. Those of skill in the art will appreciate that the invention may be practiced in other embodiments. First, the particular naming of the components and variables, capitalization of terms, the attributes, data structures, or any other programming or structural aspect is not mandatory or significant, and the mechanisms that implement the invention or its features may have different names, formats, or protocols. Also, the particular division of functionality between the various system components described herein is merely exemplary, and not mandatory; functions performed by a single system component may instead be performed by multiple components, and functions performed by multiple components may instead performed by a single component.

It should be noted that various functionalities described herein may be combined in ways not explicitly described. For instance, data can be tokenized to include one or more use rules such that the resulting tokenized data fails a validation test and is verifiable. Thus, while self aware tokenization and verifiable tokenization are described separately, aspects of each may be performed in concert, and the resulting tokenized data can be both self aware tokenized data and verifiable tokenized data.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determine" refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a non-transitory computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of computer-readable storage medium suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the art, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method comprising:
receiving, at an intermediate server from a sender device, structured data comprising a physical address, the physical address comprising a street number component, a street name component, and a city name component;
accessing, by the intermediate server, a set of encoding rules, the set of encoding rules comprising a first encoding action corresponding to the street number component, a second encoding action different from the first encoding action corresponding to the street name component, and a third encoding action different from the first encoding action and the second encoding action corresponding to the city name component, at least one of the first encoding action, the second encoding action, and the third encoding action comprising a tokenization operation;
modifying, by the intermediate server, structured data, wherein modifying the structured data comprises:
encoding the street number component of the structured data based on the first encoding action corresponding to the street number component;
encoding the street name component of the structured data based on the second encoding action corresponding to the street name component; and
encoding the city name component of the structured data based on the third encoding action corresponding to the city name component; and
transmitting, by the intermediate server, the modified structured data to a recipient device.

2. The computer-implemented method of claim 1, wherein the set of encoding rules identifies a token table for use with the tokenization operation.

3. The computer-implemented method of claim 2, wherein encoding a first component of the street number component, the street name component, and the city name component comprises tokenizing the first component using the identified token table.

4. The computer-implemented method of claim 3, wherein tokenizing the first component comprises querying the identified token table with a portion of the first component to identify a token mapped to the portion of the first component and replacing the portion of the first component with the identified token.

5. The computer-implemented method of claim 3, wherein the first component comprises characters from a set of allowable characters, and wherein the identified token table maps a plurality of values to tokens comprising characters from the set of allowable characters.

6. The computer-implemented method of claim 1, wherein a least one of the first encoding action, the second encoding action, and the third encoding action specifies an encryption operation, and wherein the set of encoding rules identifies an encryption key for use with the encryption operation.

7. The computer-implemented method of claim 6, wherein encoding a first component of the street number component, the street name component, and the city name component comprises encrypting the first component using the identified encryption key.

8. The computer-implemented method of claim 1, wherein at least one of the first encoding action, the second encoding action, and the third encoding action specifies a first component of the street number component, the street name component, and the city name component to be maintained as clear text.

9. An intermediate server system, comprising:
a non-transitory computer-readable storage medium storing executable computer instructions for:

receiving, from a sender device, structured data comprising a physical address, the physical address comprising a street number component, a street name component, and a city name component;

accessing a set of encoding rules, the set of encoding rules comprising a first encoding action corresponding to the street number component, a second encoding action different from the first encoding action corresponding to the street name component, and a third encoding action different from the first encoding action and the second encoding action corresponding to the city name component, at least one of the first encoding action, the second encoding action, and the third encoding action comprising a tokenization operation;

modifying the structured data, wherein modifying the structured data comprises:
  encoding the street number component of the structured data based on the first encoding action corresponding to the street number component;
  encoding the street name component of the structured data based on the second encoding action corresponding to the street name component; and
  encoding the city name component of the structured data based on the third encoding action corresponding to the city name component; and
transmitting the modified structured data to a recipient device; and
a processor configured to execute the instructions.

10. The system of claim 9, wherein the set of encoding rules identify a token table for use with the tokenization operation.

11. The system of claim 10, wherein encoding a first component of the street number component, the street name component, and the city name component comprises tokenizing the first component using the identified token table.

12. The system of claim 11, wherein tokenizing the first component comprises querying the identified token table with a portion of the first component to identify a token mapped to the portion of the first component and replacing the portion of the first component with the identified token.

13. The system of claim 11, wherein the first component comprises characters from a set of allowable characters, and wherein the identified token table maps a plurality of values to tokens comprising characters from the set of allowable characters.

14. The system of claim 9, wherein a least one of the first encoding action, the second encoding action, and the third encoding action specifies an encryption operation, and wherein the set of encoding rules identifies an encryption key for use with the encryption operation.

15. The system of claim 14, wherein encoding a first component of the street number component, the street name component, and the city name component comprises encrypting the first component using the identified encryption key.

16. The system of claim 9, wherein at least one of the first encoding action, the second encoding action, and the third encoding action specifies a first component of the street number component, the street name component, and the city name component to be maintained as clear text.

17. A non-transitory computer-readable storage medium storing executable computer instructions that, when executed by a hardware processor, cause an intermediate device to perform steps comprising:

receiving from a sender device, structured data comprising a physical address, the physical address comprising a street number component, a street name component, and a city name component;

accessing a set of encoding rules, the set of encoding rules comprising a first encoding action corresponding to the street number component, a second encoding action different from the first encoding action corresponding to the street name component, and a third encoding action different from the first encoding action and the second encoding action corresponding to the city name component, at least one of the first encoding action, the second encoding action, and the third encoding action comprising a tokenization operation;

modifying structured data, wherein modifying the structured data comprises:
  encoding the street number component of the structured data based on the first encoding action corresponding to the street number component;
  encoding the street name component of the structured data based on the second encoding action corresponding to the street name component; and
  encoding the city name component of the structured data based on the third encoding action corresponding to the city name component; and
transmitting the modified structured data to a recipient device.

18. The non-transitory computer-readable storage medium of claim 17, wherein the set of encoding rules identifies a token table for use with the tokenization operation.

19. The non-transitory computer-readable storage medium of claim 18, wherein encoding a first component of the street number component, the street name component, and the city name component comprises tokenizing the first component using the identified token table.

20. The non-transitory computer-readable storage medium of claim 19, wherein tokenizing the first component comprises querying the identified token table with a portion of the first component to identify a token mapped to the portion of the first component and replacing the portion of the first component with the identified token.

* * * * *